US009813786B2

(12) United States Patent
Cvijetic et al.

(10) Patent No.: US 9,813,786 B2
(45) Date of Patent: Nov. 7, 2017

(54) TOPOLOGY-RECONFIGURABLE OPTICAL MOBILE FRONTHAUL ARCHITECTURE WITH SOFTWARE-DEFINED CONNECTIVITY AND HIERARCHICAL QOS

(71) Applicant: NEC Laboratories America, Inc., Princeton, NJ (US)

(72) Inventors: Neda Cvijetic, Plainsboro, NJ (US); Akihiro Tanaka, Plainsboro, NY (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/607,075

(22) Filed: Jan. 28, 2015

(65) Prior Publication Data

US 2015/0215044 A1    Jul. 30, 2015

Related U.S. Application Data

(60) Provisional application No. 61/932,424, filed on Jan. 28, 2014.

(51) Int. Cl.
*H04Q 11/00* (2006.01)
*H04J 14/02* (2006.01)
*H04L 12/931* (2013.01)
*H04L 12/24* (2006.01)
*H04L 12/26* (2006.01)

(52) U.S. Cl.
CPC ...... *H04Q 11/0005* (2013.01); *H04J 14/0256* (2013.01); *H04J 14/0284* (2013.01); *H04L 41/12* (2013.01); *H04L 49/00* (2013.01); *H04Q 11/0062* (2013.01); *H04Q 11/0067* (2013.01); *H04L 43/0811* (2013.01)

(58) Field of Classification Search
CPC .................................................. H04Q 11/0067
See application file for complete search history.

(56) References Cited

U.S. PATENT DOCUMENTS

| 2008/0281993 | A1* | 11/2008 | Nicholson | G06F 3/0622 710/9 |
| 2011/0262142 | A1* | 10/2011 | Archambault | H04J 14/02 398/83 |
| 2014/0086576 | A1* | 3/2014 | Campbell | H04J 14/0269 398/28 |

(Continued)

OTHER PUBLICATIONS

Neda Cvijetic, Akihiro Tanaka, Konstantinos Kanonakis, and Ting Wang, "SDN-controlled topology-reconfigurable optical mobile fronthaul architecture for bidirectional CoMP and low latency inter-cell D2D in the 5G mobile era," Opt. Express 22, 20809-20815 (Aug. 20, 2014).*

(Continued)

*Primary Examiner* — Nathan Curs
(74) *Attorney, Agent, or Firm* — Joseph Kolodka (57) ABSTRACT

A method includes providing run-time optical 5G mobile fronthaul MFH topology re-configurability through software-defined control of both optical circuit switches and electrical packet switches readily accommodating unpredictable traffic patterns and low latency optical by-pass based device-to-device connectivity. The providing includes employing an optical any-to-any switch for wavelength-tunable and fixed-wavelength optical transceivers.

18 Claims, 4 Drawing Sheets

(56) References Cited

U.S. PATENT DOCUMENTS

2014/0241717 A1* 8/2014 Cvijetic ............ H04Q 11/0067
398/48

OTHER PUBLICATIONS

Gringeri et al.; Extending Software Defined Network Principles to Include Optical Transport. IEEE Communications Magazine; Mar. 2013 [online], [retrieved on Jul. 19, 2017]. Retrieved from the Internet <URL: www.comsoc.org/sites/default/files/webfm/Publications/Magazines/ci/ofc/014.pdf>).*

* cited by examiner

TOPOLOGY-RECONFIGURABLE OPTICAL MOBILE FRONTHAUL ARCHITECTURE WITH SOFTWARE-DEFINED CONNECTIVITY AND HIERARCHICAL QOS

RELATED APPLICATION INFORMATION

This application claims priority to provisional application No. 61/932,424 filed Jan. 28, 2014, entitled "Topology-Reconfigurable 5G Optical Mobile Fronthaul Architecture with Software-Defined Any-to-any Connectivity and Hierarchical QoS", the contents thereof are incorporated herein by reference

BACKGROUND OF THE INVENTION

The present invention relates generally to optics, and more particularly, to Topology-Reconfigurable 5G Optical Mobile Fronthaul Architecture with Software-Defined Any-to-any Connectivity and Hierarchical QoS.

The proliferation of smart mobile devices and services has led to the advent of advanced wireless communications and networking features envisioned to be key aspects of next-generation 5G mobile systems, including massive multiple input multiple output (MIMO) techniques, device-to-device (D2D) communication, and heterogeneous/small-cell architectures. However, the data rate, synchronization, and latency demands these advanced features place on the mobile backhaul network are tremendous, often dramatically exceeding current performance specifications. Moreover, as mobile systems evolve to 5G, wherein as many as 10 mobile devices/connections per person operating in various wireless spectrum bands are envisioned to be interconnected into a centralized cloud-based "Internet of Things", the requirements on the backhaul network will become even more stringent. Dynamic (run-time) network resource allocation to accommodate unpredictable traffic patterns, any-to-any device connectivity, and sophisticated hierarchical quality-of-service (QoS) that differentiates between devices/services in an intelligent and flexible way are expected to become just as important to the user experience as traditional performance metrics (e.g. data rate and latency guarantees.) The present invention thus seeks to solve this problem through a novel topology-reconfigurable 5G optical mobile fronthaul (MFH) architecture with software-defined any-to-any connectivity and hierarchical QoS support.

The following references are noted in the background discussion below:
[1] N. Cvijetic et al, Proc. OFC 2012, paper PDP5B.7.
[2] N. Cvijetic et al, Proc. OFC 2013, paper PDP5B.2.
[3] C. Liu et al, Proc. OFC 2013, paper OTh4A.4.
[4] P. Chanclou et al, "Optical Fiber Solution for Mobile Fronthaul to Achieve Cloud Radio Access Network," Proc. 2013 Future Networks Summit (www.FutureNetworkSummit.eu/2013).
[5] D. Samardzija et al, IEEE Trans. Wireless Commun., vol. 11, no. 9, September 2012.

In previous work, novel optical mobile backhaul (MBH) architectures [1-3] supporting higher data rates, higher cell densities, lower latency, and accurate synchronization have been proposed. However, the latency and synchronization performance of the previously proposed optical MBH approaches are not sufficient to support advanced 5G features, either because the required processing is implemented too far back in the network and away from the cell site, incurring transmission latencies, or because the network upgrades needed to move the required processing functionality closer to the cell are prohibitively complex and costly. To overcome these limitations, novel optical MFH architectures using the common public radio interface (CPRI) have also been proposed [4]. However, while CPRI-based optical MFH can satisfy latency and synchronization requirements, it imposes an orders-of-magnitude bandwidth overhead even for 3G/4G systems, which simply cannot be sustained for 5G. Bandwidth compression techniques for CPRI traffic have also been investigated [5], yet require additional processing overhead which increases latency. The proposed CPRI compression techniques moreover do not support statistical multiplexing, nor offer sufficiently large gains to offset increases expected from e.g. massive MIMO deployments. Furthermore, neither previous optical MBH nor previous optical MFH approaches [1-4] have considered topology re-configurability for D2D communication and hierarchical QoS. In terms of software-defined control, previous work on optical MBH [2] has considered software-defined wavelength virtualization and switching between different MBH transceiver modes (e.g. CPRI vs. OFDMA). However, software-defined control for topology re-configurability, D2D communication, and hierarchical QoS has neither been proposed nor demonstrated either for optical MBH or MFH networks.

Accordingly there is a need for topology-reconfigurable 5G optical mobile fronthaul configuration with software-defined any-to-any connectivity and hierarchical quality of service.

BRIEF SUMMARY OF THE INVENTION

The invention is directed to a method for providing run-time optical 5G mobile fronthaul topology re-configurability through software-defined control of both optical circuit switches and electrical packet switches readily accommodating unpredictable traffic patterns and low latency optical by-pass based device-to-device connectivity, the providing includes employing an optical any-to-any switch for wavelength-tunable and fixed-wavelength optical transceivers, respectively; providing, with the wavelength-tunable optical transceivers, optical bypass functionality and optical-layer any-to-any connectivity enabled by optical elements in a manner not requiring wavelength tunability or software defined network SDN based control for optical multiplexer and demultiplexer components and decreased switching times compared to optical microelectromechanical systems switches; providing, with the wavelength-tunable optical transceivers instantiation, optical bypass functionality and optical-layer any-to-any connectivity using low-cost fixed wavelength optical transceivers that do not require wavelength tunability or SDN-based control, through exploitation of centralized wavelength tuning functionality of SDN-controlled wavelength-tunable optical demultiplexer elements; and enabling, with optical circulators a bi-directional downlink/uplink any-to-any optical transceiver connectivity and optical bypass functionality to be implemented using single-fiber optical access mobile fronthaul configurations.

In a similar aspect of the invention, there is provided an optical network including a run-time optical 5G MFH topology re-configurability through software-defined control of both optical circuit switches and electrical packet switches readily accommodating unpredictable traffic patterns and low latency optical by-pass based device-to-device connectivity, the network including: an optical any-to-any switch for wavelength-tunable and fixed-wavelength optical transceivers, respectively, the wavelength-tunable optical transceivers providing optical bypass functionality and optical-layer any-to-any connectivity enabled by optical elements in a manner not requiring wavelength tunability or software defined network SDN-based control for optical multiplexer and demultiplexer components and decreased switching times compared to optical microelectromechanical systems switches; the wavelength-tunable optical transceivers instantiation providing optical bypass functionality and optical-layer any-to-any connectivity using low-cost fixed wavelength optical transceivers that do not require wavelength tunability or SDN-based control, through exploitation of centralized wavelength tuning functionality of SDN-controlled wavelength-tunable optical demultiplexer elements; and optical circulators enabling a bi-directional downlink/uplink any-to-any optical transceiver connectivity and optical bypass functionality to be implemented using single-fiber optical access mobile fronthaul configurations.

These and other advantages of the invention will be apparent to those of ordinary skill in the art by reference to the following detailed description and the accompanying drawings.

DETAILED DESCRIPTION

The present invention enables run-time optical 5G MFH topology re-configurability through software-defined control of both optical circuit switches and electrical packet switches, readily accommodating unpredictable traffic patterns and low-latency optical by-pass based D2D connectivity. Through the proposed combination of software-defined optical (SDO) and software-defined networking (SDN), the optical MFH network can dynamically support point-to-point, passive optical network (PON), and/or mesh topologies. Software-defined control with OpenFlow signaling is used for optical MFH network virtualization and additional control parameter transmission over the MFH network. Finally, optical Ethernet mechanisms are exploited for bandwidth overhead removal, timing delivery/control, multi-technology support, any-to-any connectivity.

Figure 1:
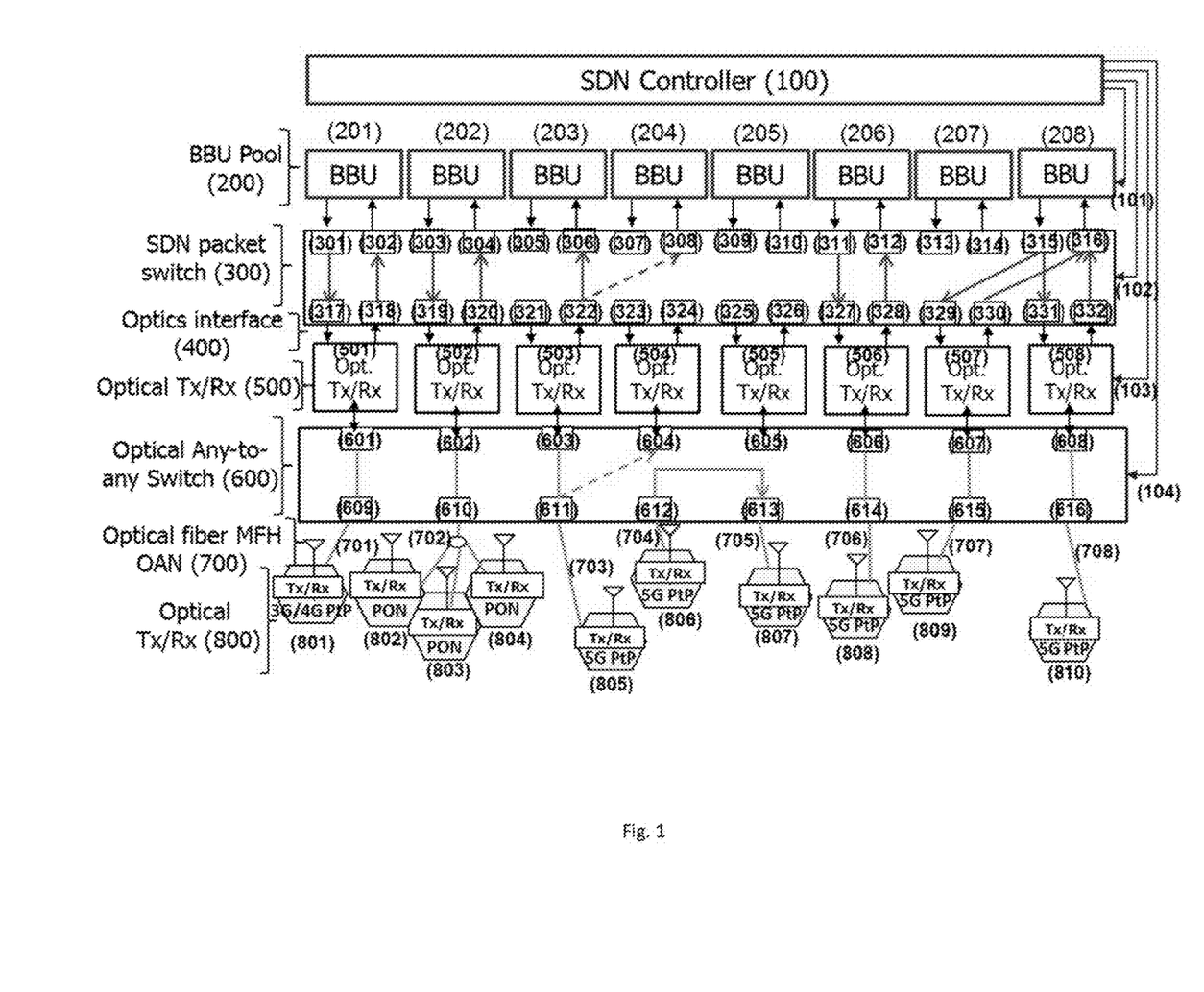
FIG. 1 is a diagram of a proposed topology-reconfigurable optical MFH architecture supporting software-defined any-to-any connectivity and hierarchical QoS; SDN=software defined networking; BBU=baseband unit; Tx=transmitter; Rx=receiver; OAN=optical access network.

FIG. 1 illustrates the proposed topology-reconfigurable optical MFH architecture. It is noted that the number of ports/elements and configuration arrangements shown in FIG. 1 are illustrative without loss of generality. In FIG. 1, a SDN controller (100) features centralized control plane connections (101)-(104) to both electrical and optical domain switching and processing elements. Specifically, control plane connection (101) links (100) with the BBU pool (200) consisting of elements (201)-(208); control plane connection (102) links the controller (100) with the SDN packet switch (300) featuring unidirectional ports (301)-(332); control plane connection (103) links the controller (100) with the optical transceiver array (500) elements (501)-(508); and control plane connection (104) links the controller (100) with the optical any-to-any switch (600) featuring bidirectional ports (601)-(616).

Topology reconfiguration decisions made by the controller (100) can thus be implemented at run-time by configuring the aforementioned electrical and optical switching and processing elements using the control plane connections (101)-(104), which may be instantiated using a variety of SDN-compatible interface languages, such as OpenFlow, for example. By dynamically configuring the individual elements of (200), (300), (500), and (600), topology re-configurability supporting point-to-point (PtP), point-to-multi-point (PtMP) and passive optical network (PON), and mesh architectures is enabled. Specifically, by connecting ports (301) and (317), (302) and (318), and (601) and (609), a bidirectional PtP optical MFH connection is created between the BBU (201) and a remote 3G/4G cell site (801) using a single optical fiber (701). Similarly, by connecting ports (303) and (319), (304) and (320), and (602) and (610), a bidirectional PtMP (i.e. PON) optical MFH connection is created between the BBU (202) and remote cell sites (802)-(804) using a single optical distribution fiber (702). In this way, legacy PtP and PON architectures can be unified under a common 5G optical MFH architecture. Optical MFH for new 5G sites can readily be added to the topology-reconfigurable network.

As shown in FIG. 1, by connecting ports (311) and (327), (312) and (328), and (606) and (614), a bidirectional PtP optical MFH connection is created between the BBU (206) and a new 5G cell site (808) using a single optical fiber (706). Moreover, as shown in FIG. 1, by connecting port (315) with ports (329) and (331), port (607) with (615), and port (608) with (616) a downlink PtMP optical MFH connection is created between the BBU (208) and remote cell sites (809) and (810), enabling support for advanced downlink CoMP features between these two cell sites. Likewise, as also shown in FIG. 1, by maintaining the connections of port (607) with (615) and port (608) with (616), and ports (330) and (332) port (316), an uplink PtMP optical MFH connection is created between the BBU (208) and remote cell sites (809) and (810), enabling support for advanced uplink CoMP features between these two cell sites. Finally, the simultaneous operation of the downlink and uplink PtMP configurations of FIG. 1 creates a mesh-like topology in the reconfigurable architecture, supporting any-to-any node connectivity.

Furthermore, as shown in FIG. 1, the proposed architecture also introduces advanced D2D connectivity with low latency enabled by software-defined optical-layer switching functionality of (600). Specifically, by configuring a connection between optical switch ports (612) and (613), a direct connection is made between 5G cell sites (806) and (807), connected to the optical switch via single optical fibers (705) and (706), respectively. By thus configuring the optical switch ports (612) and (613), a direct D2D optical-layer connection is made between 5G cell sites (806) and (807), enabling D2D communication between these sites without even requiring access to the higher layers of the network. In so doing, the latency and energy consumption are notably reduced.

To illustrate this, it may be observed from FIG. 1, that if the direct link enabled by a connection between (612) and (613) was not feasible, data traffic exchange between cell sites (806) and (807) would otherwise require that data from (806) travel over the fiber (701) through optical switch port (612) to port (604), undergo optical-to-electrical conversion in the optical transceiver (504), be passed from electrical switch port (324) to port (308), processed in the BBU (204), forwarded via switch (307) to switch (325), undergo electrical-to-optical conversion in the optical transceiver (505), travel through an optical switch connection of ports (605) and (613) over the optical fiber (705), and finally be received by the destination (807). Due to the multi-layer path the second option entails, both the latency and energy consumption can be substantially higher compared to the optical by-pass approach. However, since both options are supported by the proposed architecture, hierarchical QoS can be enabled, wherein different latency guarantees can be provided to different classes/types of traffic, which can be attractive for both monetizing the network and optimizing the end-user experience.

Finally, as shown in FIG. 1, the topology re-configurability enabled by the optical layer switching functionality of (600) can be exploited to support other advanced functions, such as BBU load balancing/migration. By reconfiguring the optical switch (600) from a connection between ports (611) and (603) to a connection between ports (611) and (604), the traffic to/from cell site (805) traveling over the optical fiber (703) can be migrated from BBU (203) to BBU (204). The same functionality may also be enabled by maintaining the optical connection between ports (611) and (603) and reconfiguring the SDN switch (300) port connections from (322) connecting to (306) to (322) connecting to (308). The proposed architecture thus enables a dual-layer approach for BBU migration and load balancing functionality, supporting both circuit-level and packet-level granularity.

It is also noted that the optics interface (400) in FIG. 1 may feature different protocols, including CPRI, with Ethernet proposed as an attractive choice for CPRI-based bandwidth overhead removal, timing delivery/control, multi-technology support, and any-to-any L2 connectivity support. The SDN-based control plane (e.g. OpenFlow) can be used for any additional control parameter transmission over the optical MFH network, as well as for protocol/vendor agnosticity, and legacy CPRI back-compatibility. Finally, the proposed solution of FIG. 1 supports both tunable and fixed-wavelength optical Tx/Rx devices (500) and (800), wherein the remote optical Tx/Rx devices (800) may or may not feature support for SDN-based control mechanisms (e.g. OpenFlow).

Figure 2:
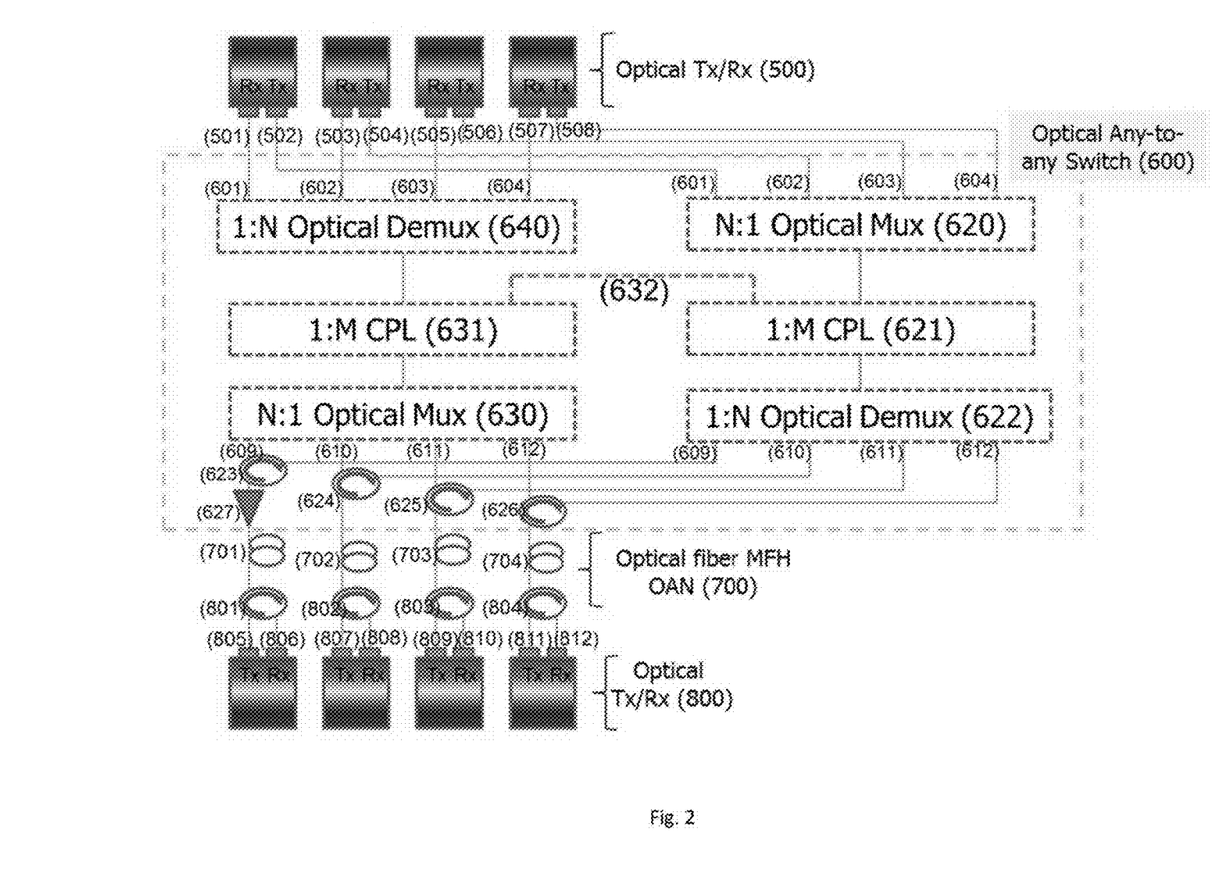
FIG. 2 is a diagram of detailed inventive features for the optical any-to-any switch (600) for the case of colorless (wavelength-tunable) optical Tx/Rx devices. Inventive features are indicated by dashed lines. CPL=coupler; Mux=multiplexer; Demux=demultiplexer.

The broadest inventive feature of the proposed solution is the optical any-to-any switch (600), shown in high-level in FIG. 1, while the lower level detailed features of (600) and their progression are shown in FIG. 2 for the case of wavelength-tunable optical Tx/Rx devices (500) and (800). FIG. 2 illustrates the inventive details for N=4 optical Tx/Rx pairs, with an extension to arbitrary integer-valued N readily feasible using the principles described here. For downlink transmission from (500) to (800), optical signals from optical transmitter ports (502), (504), (506) and (508) are first combined by a N:1 optical multiplexer (620), and then optically connected to a 1:M coupler (621), followed by an optical de-multiplexer (622). The optical mux (620) may be implemented by a N:1 fixed wavelength arrayed waveguide grating (AWG) or N:1 passive optical coupler. The optical demux (622) may be implemented by a 1:N fixed wavelength AWG, 1:N passive optical splitter, or 1:N wavelength selective switch (WSS) operated either in fixed-wavelength or tunable wavelength mode, without loss of generality.

To illustrate the placement of the N:1 mux (620) and 1:N optical demux (622) in the overall architecture of FIG. 1, the input ports of (620) have been labeled as (601)-(604), according to the notation of FIG. 1, while the output ports of (622) have been labeled as (609)-(612), also using the notation of FIG. 1. The optical demux (622) outputs are passed through circulators (623)-(626), which enable bidirectional optical transmission using a single optical fiber. At the outputs of the circulators, the optical signal may optionally be amplified using an optical amplifier (627), such as an erbium doped fiber amplifier (EDFA) or semiconductor optical amplifier (SOA). Following transmission over the optical fiber MFH OAN (700), consisting of optical fibers (701)-(704), which may optionally be terminated by passive optical splitters without loss of generality, the downlink optical signals pass through optical circulators (801)-(804) before being received by the optical receivers (806), (808), (810), (812).

By dynamically tuning the transmitting wavelengths of the transmitters (502), (504), (506) and (508), and optionally the wavelength outputs of the 1:N optical demux (622) and/or receiving wavelengths of receivers (806), (808), (810), (812), any-to-any downlink optical Tx/Rx connectivity is enabled. To support this same functionality in the uplink, optical signals from optical transmitter ports (805), (807), (809), (811) pass through optical circulators (801)-(804) and the optical fiber OAN (700), and are routed by optical circulators (623)-(626) to the input ports of a N:1 optical mux (630). The N:1 optical mux (630) may be implemented using a N:1 passive optical coupler or N:1 AWG. To illustrate the placement of the N:1 optical mux (630) in the overall architecture of FIG. 1, the input ports of (630) have been labeled as (609)-(612), according to the notation of FIG. 1. The output of the N:1 mux (630) is optically connected to a 1:M optical coupler (631), followed by a 1:N optical demux (640), with the demux (640) outputs sent to optical receivers (501), (503), (505), (507) to complete uplink transmission. The optical demux (640) may be implemented by a 1:N fixed wavelength AWG, 1:N passive optical splitter, or 1:N wavelength selective switch (WSS) operated either in fixed-wavelength or tunable wavelength mode, without loss of generality. To show the placement of the 1:N optical demux (640) in the overall architecture of FIG. 1, the input ports of (640) have been labeled as (601)-(604), according to the notation of FIG. 1. By dynamically tuning the transmitting wavelengths of the transmitters (805), (807), (809), (811), and optionally the wavelength outputs of the 1:N optical demux (640) and/or receiving wavelengths of receivers (501), (503), (505), (507), any-to-any downlink optical Tx/Rx connectivity is enabled. It is noted that the dynamic wavelength tuning in both the optical Tx/Rx (500) and (800) and optical demux elements (622) and (640) may be accomplished with software-defined control (100).

Finally, as shown in FIG. 2, the inventive feature of D2D connectivity via optical bypass is accomplished by the optical connection (632) between the 1:M coupler (631) and 1:M coupler (621), which enables optical signals from transmitters (805), (807), (809), (811) to bypass the optical demux (640) and all higher-layer functionality, including the optical receivers of (500) and higher-layer processing of (400), (300) and (200) in FIG. 1, and directly link to the optical receivers (806), (808), (810), (812) via the 1:M coupler (1:2), 1:N optical demux (622), optical circulators (623)-(626) and the optical fiber MFH OAN (700). Through the novel optical connection (632) between the 1:M coupler (631) and 1:M coupler (621), low latency, energy efficient optical-layer any-to-any connectivity is enabled. It is noted that any wavelength contention (i.e. use of the same wavelength at the same time) between optical transmitters (805), (807), (809), (811) and optical transmitters (502), (504), (506) and (508) may be resolved by dynamic wavelength tuning of the optical transceivers and/or time-domain sharing of the same wavelength channel, as orchestrated by the centralized SDN controller (100). Finally, although M=2 is the case shown in FIG. 2 for clarity and ease of understanding, (621) and (631), M may be generalized to an arbitrary integer value according to the principles of FIG. 2, enabling (M−1) optical bypass links (632) to be made to (M−1)×N optical Tx/Rx ports.

Figure 3:
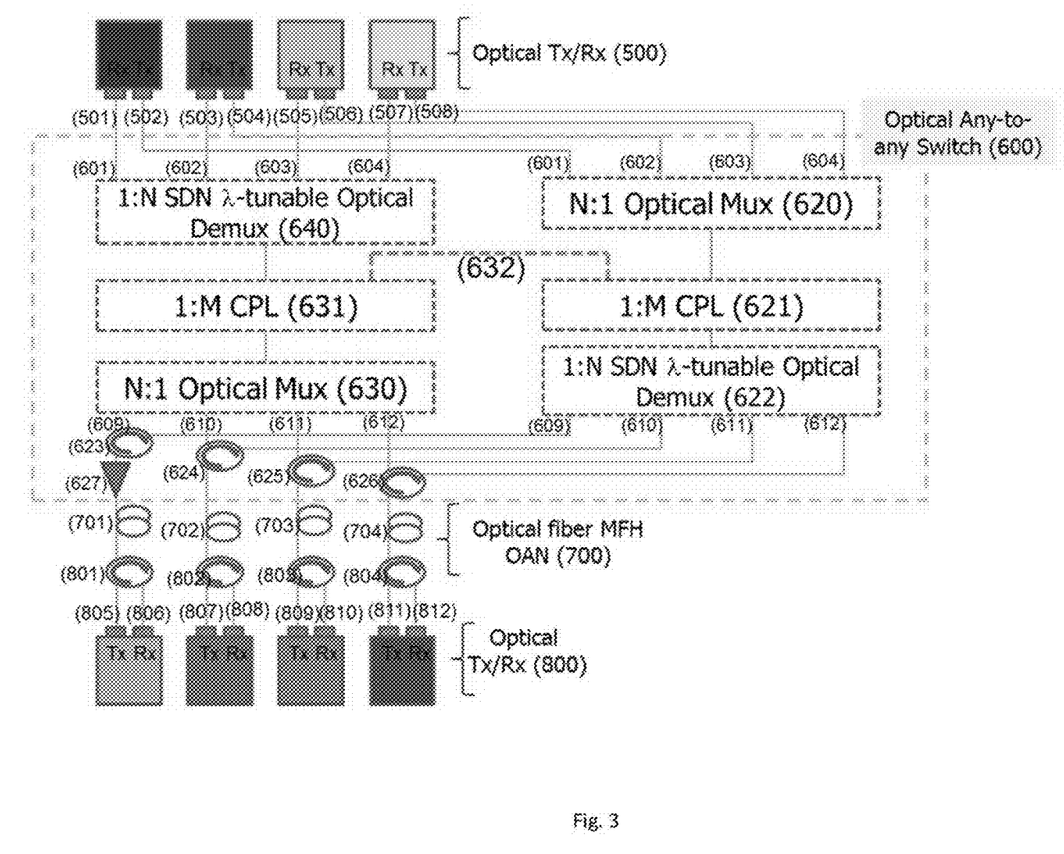
FIG. 3 is a diagram of detailed inventive features for the optical any-to-any switch (600) for the case of fixed-wavelength optical Tx/Rx devices, inventive features are indicated by dashed lines.

FIG. 3 shows the optical any-to-any switch (600) for the case of fixed-wavelength optical Tx/Rx devices (500) and (800). FIG. 3 illustrates the inventive details for N=4 optical Tx/Rx pairs, but an extension to arbitrary integer-valued N is readily feasible using the principles described here. It is noted that the functionality of the switch in FIG. 3 is the same as for the switch shown in FIG. 2, with the key difference that wavelength tunability is in no way supported by the optical transceivers (500), (800), such that 1:N optical demux elements (640) and (622) must be wavelength-tunable and SDN controlled. On the other hand, in FIG. 2, the wavelength-tunable and SDN-controlled operation of optical de-multiplexers was optional.

As shown in FIG. 3, for downlink transmission from (500) to (800), fixed-wavelength optical signals from optical transmitter ports (502), (504), (506) and (508) are first combined by a N:1 optical multiplexer (620), and then optically connected to a 1:M coupler (621), followed by a 1:N SDN-controlled and wavelength-tunable optical de-multiplexer (622). While the optical mux (620) may be implemented by a N:1 fixed wavelength arrayed waveguide grating (AWG) or N:1 passive optical coupler, the optical demux (622) needs to be a SDN-controlled 1:N wavelength selective switch (WSS) operated in tunable-wavelength mode. By dynamically tuning the wavelength outputs of the 1:N optical demux (622), any-to-any downlink optical Tx/Rx connectivity is enabled. In the uplink, optical signals from fixed-wavelength optical transmitter ports (805), (807), (809), (811) are combined by a N:1 optical mux (630), i.e. a N:1 passive optical coupler or N:1 AWG, with the mux outputs applied to a 1:M passive optical coupler (631). The inventive feature of D2D connectivity via optical bypass is accomplished by the optical connection (632) between the 1:M coupler (631) and 1:M coupler (621). Uplink any-to-any reception is enabled by the 1:N SDN-controlled wavelength-tunable optical demux (640) outputs which can route any of the transmitted signals from optical transmitter ports (805), (807), (809), (811) to any of the optical receiver ports (501), (503), (505), (507). The optical demux (640) of FIG. 3 also needs to be a SDN-controlled 1:N wavelength selective switch (WSS) operated in tunable-wavelength mode. The remaining optical device/element functionality and port numbering shown in FIG. 3 is as described in FIG. 2, remaining unchanged for the fixed-wavelength optical Tx/Rx case (FIG. 3) compared to the wavelength-tunable optical Tx/Rx case (FIG. 2).

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 4:
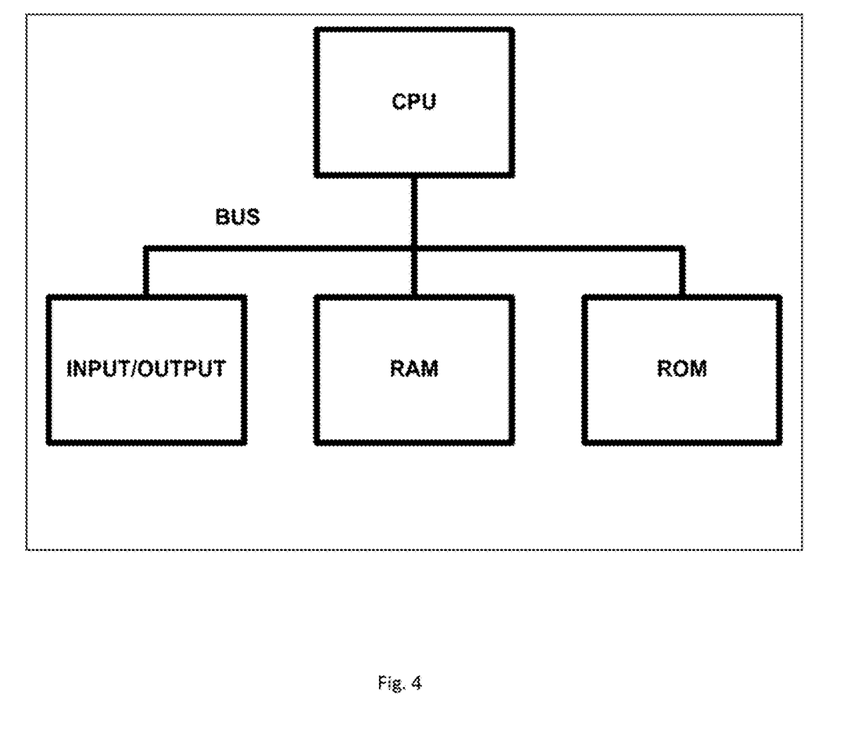
FIG. 4 is a diagram of an exemplary computer for carrying out the invention.

By way of example, a block diagram of a computer to support the invention is discussed next in FIG. 4. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention provides the ability to support advanced switching/networking functions dynamically on the optical layer, by-passing higher layer processing, notably reduces latency and energy consumption, supporting low latency CoMP, load balancing, off-loading, device-to-device connectivity, and low-latency hierarchical QoS features. The proposed solution moreover supports both an evolution toward meshed any-to-any optical MFH architectures, while remaining back-compatible with legacy point-to-point and PON systems, rendering it attractive for smooth optical MFH network migration to 5G. The proposed solution also features notably lower switching times compared to known optical any-to-any switching solutions (e.g. N×N optical microelectromechanical systems (MEMS) switches). SDN and OpenFlow control/signaling enable a device-centric network policy crucial for "bring your own device" (BYOD) networking environments, as well as packet/device-level QoS, and protocol/vendor agnosticity among network devices. Finally, Ethernet signaling enables multi-technology support, statistical multiplexing of traffic across device technologies, CPRI-based bandwidth overhead removal, and layer 2 support for optical layer any-to-any connectivity features. Consequently, the proposed approach can provide lower latency, reduce energy consumption, higher network resource utilization, and a higher quality user experience compared to previous approaches.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method comprising:
providing run-time optical mobile fronthaul (MFH) topology re-configurability through software-defined control of both optical circuit switches and electrical packet switches handling traffic patterns and latency optical by-pass based device-to-device connectivity, the providing comprising:
employing either an optical switch for wavelength-tunable transceivers or an optical switch for fixed-wavelength optical transceivers;
providing, with the wavelength-tunable optical transceivers, optical bypass functionality and optical-layer connectivity enabled by optical elements without wavelength tunability or software defined network SDN based control for optical multiplexer and demultiplexer components, or providing optical bypass functionality and optical-layer connectivity using the fixed wavelength optical transceivers without wavelength tunability or SDN-based control, through centralized wavelength tuning functionality of SDN-controlled wavelength-tunable optical demultiplexer elements; and
enabling, with optical circulators a bi-directional any-downlink/any-uplink optical transceiver connectivity and optical bypass functionality using single-fiber optical access between the circulators and mobile-side transceivers.

2. The method of claim 1, wherein the step of providing comprises a software defined network controller featuring centralized control plane connections to both optical and electrical domain switching and processing elements.

3. The method of claim 2, wherein topology reconfiguration decisions made by the software defined network controller are implementable at run-time by configuring elements of the optical and electrical domain switching and processing elements using coupled control plane connections instantiated using a variety of SDN compatible interface languages.

4. The method of claim 1, wherein the step of providing comprises providing dynamic configuring of individual elements of baseband processing units, SDN switches, the wavelength-tunable optical transceivers if employed, and the optical switches for enabling topology re-configurability supporting point-to-point, point-to-multipoint and passive optical network and mesh architectures.

5. The method of claim 1, wherein the step of providing comprises creating a bidirectional point-to-point optical mobile fronthaul MFH connection between baseband processing units and a remote 3G/4G cell site using a single optical fiber.

6. The method of claim 1, wherein the step of providing comprises creating a bidirectional point-to-multipoint optical MFH connection between baseband processing units and remote cell sites using a single optical distribution fiber.

7. The method of claim 1, wherein the step of providing comprises connecting SDN packet switch ports with optical switch ports to create a downlink point-to-multipoint optical mobile fronthaul connection between a baseband processing unit and remote cell sites for downlink multipoint communication between two cell sites.

8. The method of claim 1, wherein the step of providing with the wavelength-tunable optical transceivers comprises downlinking transmission from a first set of optical transceivers to a second set of optical transceivers, wherein optical signals from optical transmitter ports of the first set of optical transceivers are first combined by a N:1 optical multiplexer and then optically connected to an 1:M coupler, followed by an optical de-multiplexer.

9. The method of claim 8, wherein the step of providing with the wavelength-tunable optical transceivers comprises dynamically tuning transmitting wavelengths of transmitters of the first set of optical transceivers, and the wavelength outputs of the demultiplexer or receiving wavelengths of receivers of the second set of optical transceivers.

10. An optical network comprising:
a run-time optical mobile fronthaul MFH topology re-configurability through software-defined control of both optical circuit switches and electrical packet switches handling traffic patterns and latency optical by-pass based device-to-device connectivity, the network comprising:
either an optical switch for wavelength-tunable transceivers or an optical switch for fixed-wavelength optical transceivers, respectively, the wavelength-tunable optical transceivers providing optical bypass functionality or the fixed wavelength optical transceivers providing optical-layer connectivity without wavelength tunability or SDN-based control through centralized wavelength tuning functionality of SDN-controlled wavelength-tunable optical demultiplexer elements; and
optical circulators enabling a bi-directional any-downlink/any-uplink optical transceiver connectivity and optical bypass functionality using single-fiber optical access between the circulators and mobile-side transceivers.

11. The network of claim 10, wherein the run-time optical MFH topology re-configurability comprises a software defined network controller featuring centralized control plane connections to both optical and electrical domain switching and processing elements.

12. The network of claim 10, wherein topology reconfiguration decisions made by the software defined network controller are implementable at run-time by configuring elements of the optical and electrical domain switching and processing elements using coupled control plane connections instantiated using a variety of SDN compatible interface languages.

13. The network of claim 10, wherein the run-time optical MFH topology re-configurability comprises providing dynamic configuring of individual elements of baseband processing units, SDN switches, the wavelength-tunable optical transceivers if employed, and the optical switches for enabling topology re-configurability supporting point-to-point, point-to-multipoint and passive optical network and mesh architectures.

14. The network of claim 10, wherein the run-time optical MFH topology re-configurability comprises creating a bidirectional point-to-point optical mobile fronthaul MFH connection is created between baseband processing units and a remote 3G/4G cell site using a single optical fiber.

15. The network of claim 10, wherein the run-time optical MFH topology re-configurability comprises creating a bidirectional point-to-multipoint optical MFH connection between baseband processing units and remote cell sites using a single optical distribution fiber.

16. The network of claim 10, wherein the run-time optical MFH topology re-configurability comprises connecting SDN packet switch ports with optical switch ports to create a downlink point-to-multipoint optical mobile fronthaul connection between a baseband processing unit and remote cell sites.

17. The method of claim 1, wherein the run-time optical MFH topology re-configurability with the wavelength-tunable optical transceivers comprises for downlink transmission from a first set of optical transceivers to a second set of optical transceivers, optical signals from optical transmitter ports of the first set of optical transceivers are first combined by a N:1 optical multiplexer and then optically connected to an 1:M coupler, followed by an optical de-multiplexer.

18. The network of claim 17, wherein the run-time optical MFH topology re-configurability with the wavelength-tunable optical transceivers comprises dynamically tuning transmitting wavelengths of transmitters of the first set of optical transceivers.

* * * * *